United States Patent
Song et al.

(10) Patent No.: US 7,177,359 B2
(45) Date of Patent: Feb. 13, 2007

(54) METHOD AND APPARATUS TO ENCODE A MOVING IMAGE WITH FIXED COMPUTATIONAL COMPLEXITY

(75) Inventors: Byung-cheol Song, Gyeonggi-do (KR); Kang-wook Chun, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 607 days.

(21) Appl. No.: 10/323,745

(22) Filed: Dec. 20, 2002

(65) Prior Publication Data
US 2003/0156644 A1 Aug. 21, 2003

(30) Foreign Application Priority Data
Feb. 21, 2002 (KR) ................. 2002-9287

(51) Int. Cl.
*H04B 1/66* (2006.01)
(52) U.S. Cl. .............................. 375/240.16
(58) Field of Classification Search .......... 375/240.03, 375/240.13, 240.02, 240.16, 240.12; 372/250; 382/232; *H04B 1/66*
See application file for complete search history.

(56) References Cited

U.S. PATENT DOCUMENTS

| | | | | |
|---|---|---|---|---|
| 5,497,338 A | * | 3/1996 | Miyake et al. | 382/232 |
| 5,537,338 A | * | 7/1996 | Coelho | 709/204 |
| 5,832,234 A | * | 11/1998 | Iverson et al. | 709/247 |
| 6,014,181 A | * | 1/2000 | Sun | 348/699 |
| 6,091,777 A | * | 7/2000 | Guetz et al. | 375/240.11 |
| 6,611,558 B1 | * | 8/2003 | Yokoyama | 375/240.15 |
| 6,724,823 B2 | * | 4/2004 | Rovati et al. | 375/240.17 |
| 6,947,603 B2 | * | 9/2005 | Kim | 382/236 |
| 2003/0156643 A1 | * | 8/2003 | Song | 375/240.03 |
| 2004/0008898 A1 | * | 1/2004 | Song et al. | 382/250 |

FOREIGN PATENT DOCUMENTS

| | | |
|---|---|---|
| JP | 04-180383 | 6/1992 |
| JP | 6-189291 | 7/1994 |
| JP | 07-107484 | 4/1995 |
| JP | 07-162864 | 6/1995 |
| JP | 10-271514 | 10/1998 |
| JP | 2001-145109 | 5/2001 |

OTHER PUBLICATIONS

IEEE Transactions on Circuits and Systems for Video Technology, vol. 6, No. 4, Aug. 1996, pp. 419-422.
Japanese Office Action issued on May 17, 2005 in Japanese Patent Application No. 2003-041535 which corresponds to U.S. Appl. No. 10/323,745.

* cited by examiner

*Primary Examiner*—Tung Vo
(74) *Attorney, Agent, or Firm*—Staas & Halsey LLP

(57) ABSTRACT

A method, a computer readable storage, and an apparatus estimate a motion of a moving image and comprising a process of adjusting a number of search points per frame by adaptively updating a threshold value per frame to regularly maintain fixed a computational complexity of a video encoder irrespective of characteristics of the moving image.

21 Claims, 5 Drawing Sheets

METHOD AND APPARATUS TO ENCODE A MOVING IMAGE WITH FIXED COMPUTATIONAL COMPLEXITY

CROSS-REFERENCE TO RELATED APPLICATIONS

This application claims the benefit of Korean Application No. 2002-9287 filed Feb. 21, 2002 in the Korean Intellectual Property Office, the disclosure of which is incorporated herein by reference.

BACKGROUND OF THE INVENTION

1. Field of the Invention

The present invention relates to a video encoding system, and more particularly, to a method and apparatus to encode a moving image using fixed computational complexity, irrespective of characteristics of the moving image.

2. Description of the Related Art

Conventionally, a moving image is encoded using hardware. However, an improvement in performance of a central processing unit (CPU) of a personal computer (PC) and development of a high-performance media processor make it possible to encode the moving image using software. Consequently, an encoding technique to effectively reduce an amount of calculation is required to compress and restore the moving image in real time. For instance, if a motion of the moving image is estimated with a conventional video encoder according to H.263 standards using an n-step search, a discrete cosine transform (DCT)/inverse DCT module accounts for thirty percent (30%) of the processing time in the conventional video encoder. To reduce such computational complexity, the conventional video encoder uses a DCT skipping technique.

FIG. 1 is a block diagram of a conventional video encoding system. First, input video data is divided into group-of-pictures (GOP) units. A discrete cosine transform (DCT) unit 120 performs a DCT process on the video data on 8×8 block-by-block basis to obtain spatial redundancy in the video data. A quantizer (Q) 130 quantizes the video data on which the DCT process is performed. An inverse quantizer (IQ) 150 inversely quantizes the video data quantized by the Q 130. An inverse DCT (IDCT) 160 performs an IDCT process on the video data that is inversely quantized by the IQ 150. A frame memory (FM) unit 170 stores the video data, which is the IDCT processed by the IDCT unit 160, in frame units. A motion estimation (ME) unit 180 estimates a motion vector (MV) and a sum of absolute difference (SAD) of the moving image per macro block using video data of a current frame and video data of a previous frame stored in the FM unit 170. A variable length coding (VLC) unit 140 removes statistical redundancy in the video data quantized according to the MV estimated by the ME unit 180.

A DCT skipping unit 110 compares the SAD per block, which is estimated by the ME unit 180, or a quantization parameter (QP), which is generated by the Q 130, with a threshold value T, and sends to the DCT unit 120 the comparing result as skipping information on the 8×8 block-by-block basis. More specifically, the DCT skipping unit 110 restricts the video data not to be coded if a ratio SAD/QP is smaller than the threshold value T, which means that an end of block (EOB) is approximately 0, and allows the DCT unit 120 to perform the DCT process on the video data if the ratio SAD/QP is larger than the threshold value T. However, in a case that the threshold value T is a fixed value within a video sequence, complexity in DCT computation becomes different per macro block or frame. In particular, when a software video encoder is executed by a PC or a media processor, real-time encoding is impossible due to limits in the computational complexity of the PC or media processor if the DCT computational complexity changes according to the macro block or the frame.

SUMMARY OF THE INVENTION

In accordance with an aspect of the present invention, there is provided a video encoding method capable of keeping fixed a computational complexity of a video encoder by adaptively adjusting a threshold value to DCT skipping.

In accordance with an aspect of the present invention, there is provided a video encoding method and apparatus capable of keeping fixed a computational complexity of a video encoder irrespective of characteristics of an image by adjusting an ME computational complexity and a discrete cosine transform (DCT) computational complexity.

In accordance with an aspect of the present invention, there is provided a method to encode a moving image to estimate motion vectors of the moving image, the method including: comparing a sum of absolute difference (SAD) of candidate motion vectors with a threshold value that is set based on a number of search points per macro block of a previous frame; ending searching of the motion vectors of macro blocks when the SAD of each candidate motion vector is smaller than the threshold value; determining one of the candidate motion vectors having a minimum SAD to be a motion vector; and updating the threshold value with respect to a next frame according to the number of search points per macro block of a current frame when searching for the motion vector ends.

In accordance with an aspect of the present invention, there is provided a method to encode a moving image, including: comparing a threshold value, which is set according to a number of search points per macro block of a previous frame, with a sum of absolute difference (SAD) of a motion vector of the previous frame and outputting a compared result; determining whether searching of a macro block ends according to the compared result and outputting a determination result; estimating a motion estimation (ME) of the moving image based on the determination result; calculating a computational complexity of the motion estimation (ME) to obtain a difference between the ME computational complexity and a target; updating a target discrete cosine transform (DCT) complexity based on a difference between the ME computational complexity and the target,; setting the threshold value based on the updated target DCT complexity, in order to determine whether to skip performing the DCT on video data; and determining whether to perform a DCT process on the video data of a current frame according to the set threshold value.

In accordance with an aspect of the present invention, there is provided an apparatus to encode a moving image, including: a discrete cosine transform (DCT) unit performing DCT on input video data on a block-by-block basis; a quantizer quantizing the video data on which the DCT is performed and generating a quantization parameter; a motion estimation (ME) unit updating a threshold value TH according to an average number of search points per macro block of a previous frame, comparing the threshold value TH with a sum of absolute difference (SAD) per macro block, and estimating a motion vector of a current frame; a DCT computational complexity calculator calculating computational complexity according to the average number of search points per macro block according to the threshold value TH per frame updated, estimating a difference between the calculated computational complexity and a target ME computational complexity, and updating a target DCT computational complexity based on the estimated ME computational complexity; and a DCT skipping unit setting a threshold value to determine whether to skip performing DCT on the video data based on the updated target DCT computational complexity, comparing the SAD per macro block generated by the ME unit and the quantization parameter with the threshold value, and determining whether to allow the DCT unit to perform the DCT on the video data.

In accordance with an aspect of the present invention, there is provided an apparatus to encode video data, including: a discrete cosine transform (DCT) skipping unit generating a DCT skipping control signal; a DCT unit performing a DCT process on the video data in an 8×8 block-by-block unit or processing the video data not to be coded in response to the DCT skipping control signal; a quantizer quantizing the video data on which the DCT process is performed; a variable length coding (VLC) unit removing statistical redundancy from the quantized video data; an inverse quantizer (IQ) inversely quantizing the quantized video data; an inverse DCT (IDCT) unit performing an IDCT on the inversely quantized video data; a motion estimation (ME) unit estimating a motion vector (MV) and a sum of absolute difference (SAD) per macro block using the video data of a current frame and the video data of a previous frame, wherein during the estimation of the MV and the SAD, the ME unit updates a threshold value TH according to an average number of search points of the previous frame per macro block, compares the updated threshold value TH and the SAD with respect to the current frame, and determines whether searching for the motion vector is terminated.

In accordance with an aspect of the present invention, there is provided a computer readable storage controlling a computer to estimate a motion of a moving image and including a process of comparing a sum of absolute difference (SAD) of candidate motion vectors with a threshold value that is set based on a number of search points per macro block of a previous frame; ending searching of the motion vectors of macro blocks when the SAD of each candidate motion vector is smaller than the threshold value; determining one of the candidate motion vectors having a minimum SAD to be a motion vector; and updating the threshold value with respect to a next frame according to the number of search points per macro block of a current frame when searching for the motion vector ends.

In accordance with an aspect of the present invention, there is provided a computer readable storage controlling a computer to estimate a motion of a moving image and including a process of adjusting a number of search points per frame by adaptively updating a threshold value TH per frame to regularly maintain fixed a computational complexity of a video encoder irrespective of characteristics of the moving image.

In accordance with an aspect of the present invention, there is provided a computer readable storage controlling a computer to estimate a motion of a moving image and including a process of comparing a threshold value, which is set according to a number of search points per macro block of a previous frame, with a sum of absolute difference (SAD) of a motion vector of the previous frame and outputting a compared result; determining whether searching of a macro block ends according to the compared result and outputting a determination result; estimating a motion estimation (ME) of the moving image based on the determination result; calculating a computational complexity of the motion estimation (ME) to obtain a difference between the ME computational complexity and a target; updating a target discrete cosine transform (DCT) complexity based on a difference between the ME computational complexity and the target; setting the threshold value based on the updated target DCT complexity, in order to determine whether to skip performing the DCT on video data; and determining whether to perform a DCT process on the video data of a current frame according to the set threshold value.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and other aspects and advantages of the invention will become apparent and more readily appreciated from the following description of the embodiments, taken in conjunction with the accompanying drawings of which.

DETAILED DESCRIPTION OF THE INVENTION

Figure 1:
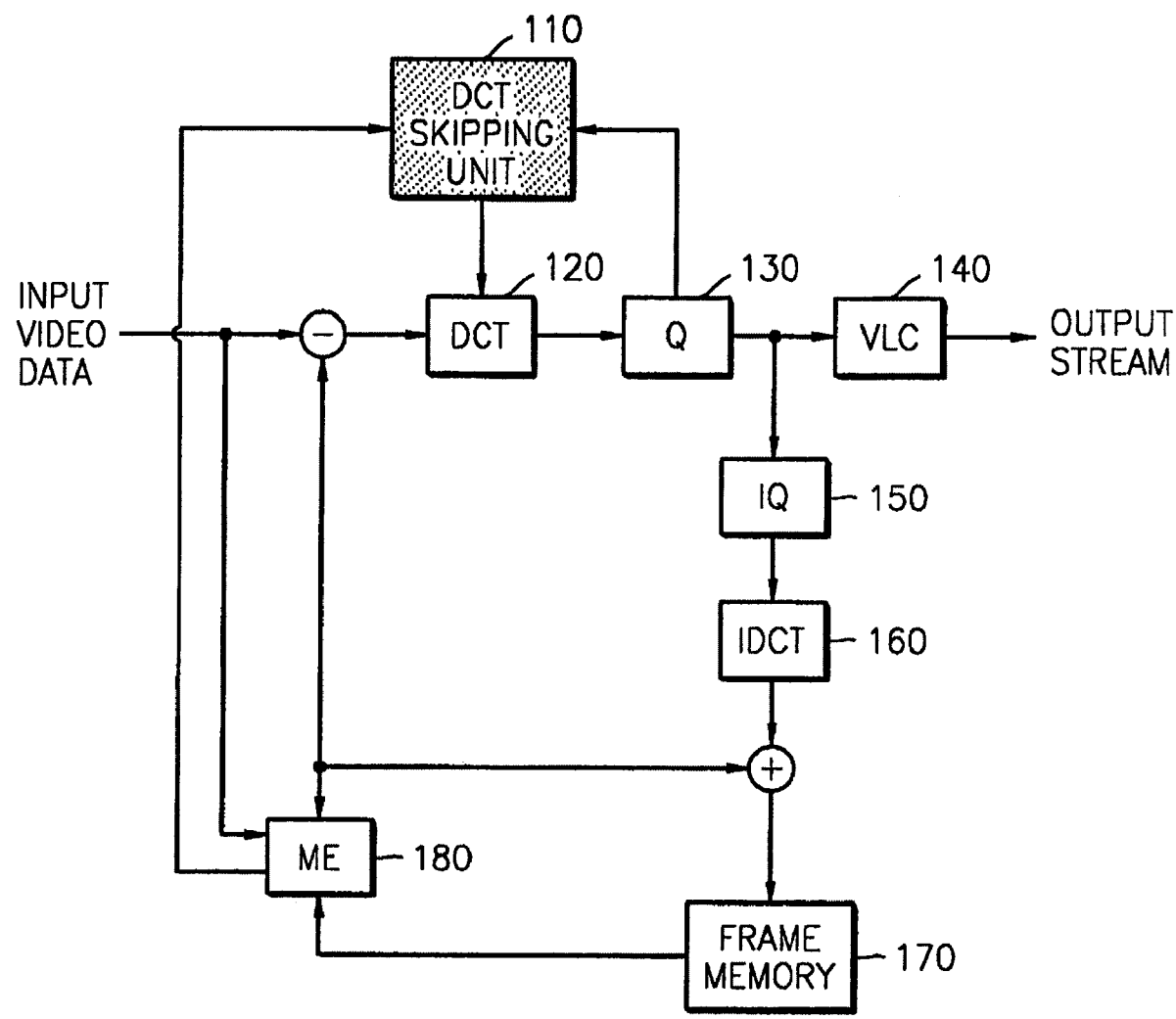
FIG. 1 is a block diagram of a conventional video encoding system.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
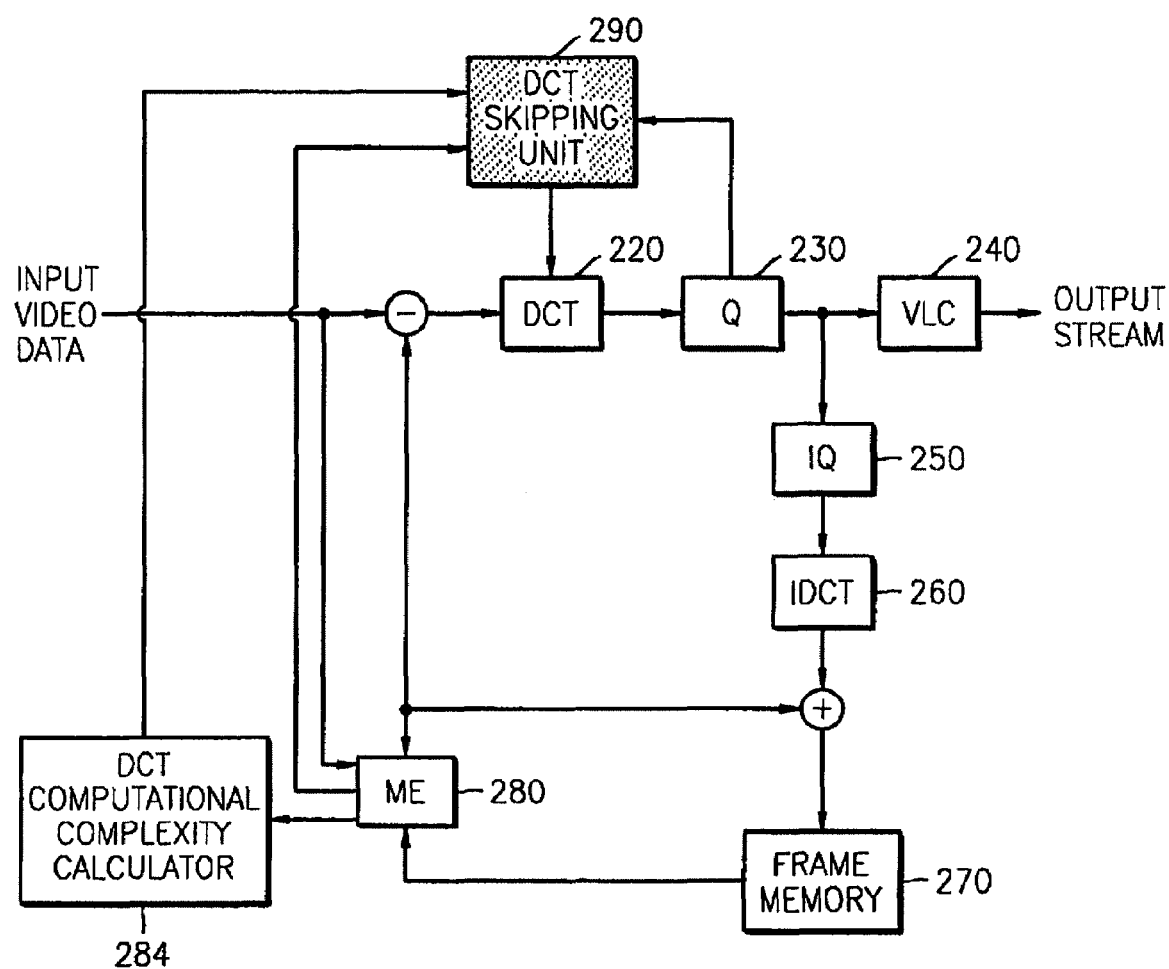
FIG. 2 is a block diagram of a structure of a video encoder according to an aspect of the present invention.

FIG. 2 is a block diagram of a structure of a video encoder according to an aspect of the present invention. Referring to FIG. 2, input video data includes frames in 8×8 block units.

A discrete cosine transform (DCT) unit 220 performs a DCT process on the input video data in an 8×8 block-by-block unit or processes the input video data not to be coded in response to a DCT skipping control signal generated by a DCT skipping unit 290. A quantizer (Q) 230 quantizes the video data on which the DCT process is performed by the DCT unit 220. A variable length coding (VLC) unit 240 removes statistical redundancy in the quantized video data. An inverse quantizer (IQ) 250 inversely quantizes the quantized video data. An inverse DCT (IDCT) unit 260 performs an IDCT on the inversely quantized video data. A frame memory (FM) unit 270 stores the video data, on which the IDCT unit 260 performs the IDCT in frame units. A motion estimation (ME) unit 280 estimates a motion vector (MV) and a sum of absolute difference (SAD) per macro block using the video data of a current frame and the video data of a previous frame stored in the FM unit 270. During the estimation of the MV and the SAD, the ME unit 280 updates a threshold value TH according to an average number of search points of the previous frame per macro block, compares the updated threshold value TH and the SAD with respect to the current frame, and determines whether searching for the motion vector is terminated or not.

A DCT computational complexity calculator 284 calculates an overall ME computational complexity of the previous frame used by the ME unit 280 in order to estimate a difference between the overall ME computational complexity and a target ME, and updates a target DCT computational complexity based on the difference.

The DCT skipping unit 290 sets a threshold value $T_{on+1}$ according to the updated target DCT computational complexity to skip performing the DCT process on the current frame. Next, the DCT skipping unit 290 compares the SAD per block estimated by the ME unit 280 and a quantization parameter (QP) estimated by the Q 230 with the set threshold value $T_{on+1}$, and sends the DCT unit 220 the compared result as DCT skipping information.

Figure 3:
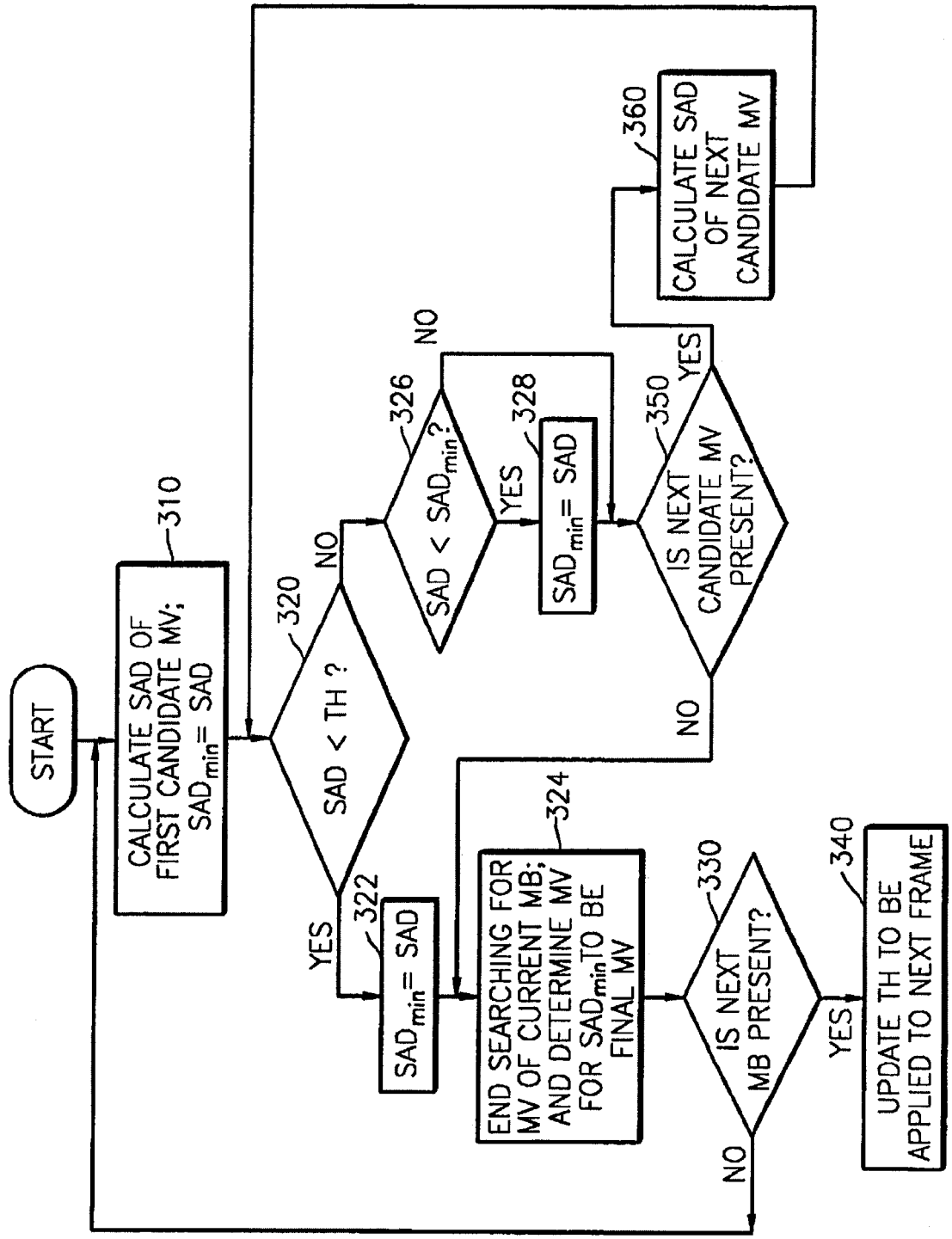
FIG. 3 is a flowchart illustrating a method of estimating motion of a moving image with a motion estimation (ME) unit according to an aspect of the present invention.

FIG. 3 is a flowchart illustrating a method of estimating a motion of a moving image with the ME unit 280 according to an aspect of the present invention. Referring to FIG. 3, first, according to a certain method of estimating high-speed motion of the image, at operation 310, the SAD of a first-candidate motion vector of a macro block, which is being processed, is calculated and set to a minimum SAD=$SAD_{min}$.

At operation 320, the calculated SAD is compared with the predetermined threshold value TH, which is the number of search points of the previous frame per macro block. As a result, if the SAD is smaller than the threshold value TH, the SAD is determined to be the minimum SAD=$SAD_{min}$. At the same time, at operation 324, searching for a motion vector of a current macro block is terminated, and a candidate motion vector of the minimum SAD=$SAD_{min}$ is determined to be a final motion vector of the current macro block. Next, at operation 330, the method checks if there are any macro blocks to be processed in the current frame. If there are still macro blocks to be processed, the method goes back to operation 310 and the motion of the image in the macro block is estimated. If not, the method proceeds to operation 340 and the threshold value TH is updated according to the average number of searching points of each macro block of the current frame, and the motion of a next frame is estimated based on the threshold value TH. Also, at operation 340, the threshold value TH is updated using the formula (THn·Sn)/St, wherein THn denotes a previous threshold value, Sn denotes the average number of search points of each macro block of the previous frame, and St denotes a target number of search points per macro block. A calculation of the threshold value TH is based on the fact that it is proportional to a computational complexity of the ME unit 280. That is, the threshold value TH of an n+1st frame is calculated as follows:

$$TH_{n+1} = \omega \cdot \frac{1}{M} \sum_{i=0}^{M} SAD_{n\min}[i] \quad (1)$$

wherein M denotes a number of macro blocks per frame, $SAD_{n\min}$ denotes a minimum SAD of an ith macro block for an nth frame, and w denotes a constant. Also, in general, the threshold value TH is inversely proportional to the average number of search points as follows:

$$TH_n \propto \frac{1}{S_n} \quad (2)$$

wherein Sn denotes the ME computation complexity in the nth frame. The method of FIG. 3 according to an aspect of the present invention uses a block-based gradient descent search (BBGDS) algorithm introduced by L. K. Liu and E. Feig, "A Block-Based Gradient Descent Search Algorithm for Block Motion Estimation in Video Coding", IEEE Trans. Circ. Sys. for Video Tech., vol. 6, no. 4, pp. 419–422, August 1996. In a case of the BBGDS, the number of search points per macro block is S presented in equation 2.

Equation 2 may also be written as follows:

$$TH_n = \frac{k}{S_n} \quad (3)$$

$$TH_{n+1} = k\frac{1}{S_t} \quad (4)$$

Based on equations 3 and 4, the following equation 5 is obtained:

$$TH_{n+1} = TH_n \frac{S_n}{S_t} \quad (5)$$

After operation 310, the method checks, in operation 320, whether the threshold value TH is larger than the SAD. If the threshold value TH is smaller than the SAD, at operation 326, the method checks if the SAD is smaller than the minimum SAD=$SAD_{min}$. If so, at operation 328, the SAD is determined to be the minimum SAD=$SAD_{min}$. Thereafter, at operation 350, if the presence of a next candidate motion vector is checked, at operation 360, a SAD corresponding to the candidate motion vector is calculated. Next, at operation 320, the calculated SAD is compared with the threshold value TH.

Accordingly, according to an aspect of the present invention, the motion vector of each candidate in a search region is searched for using a technique of estimating a certain high-speed motion. If the SAD corresponding to the motion vector of a certain candidate is smaller than the threshold value of the current frame, which is based on the threshold value of the previous frame, and the average number of search points per macro block of the previous frame, the motion vectors of the other candidates are not searched for and the motion vector of the remaining candidate is determined to be the final motion vector.

Figure 4:
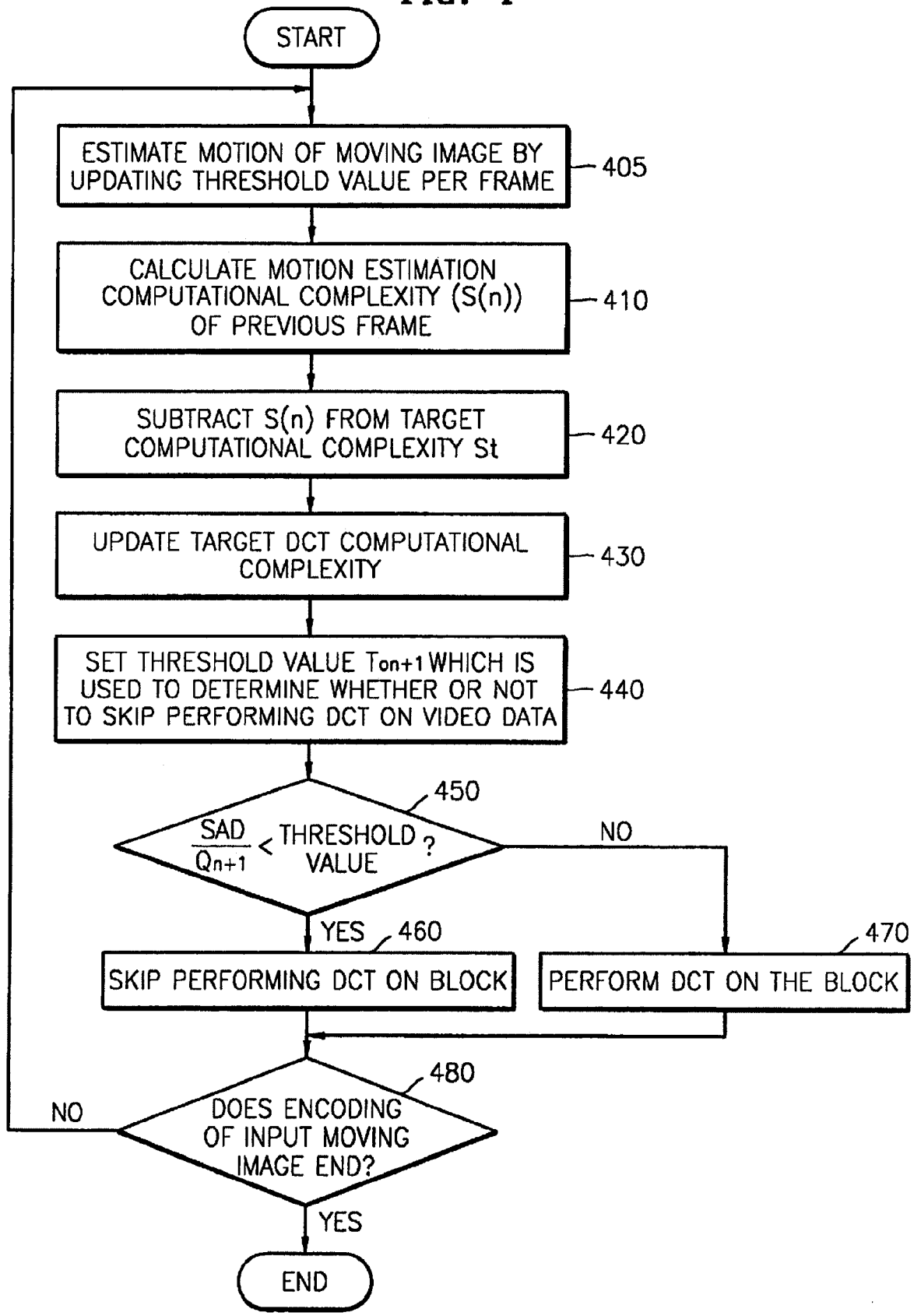
FIG. 4 is a flowchart illustrating a method to encode the moving image according to an aspect of the present invention.

FIG. 4 is a flowchart illustrating a method to encode a moving image according to an aspect of the present invention. Referring to FIG. 4, first, a target motion estimation (ME) computational complexity St and a target DCT computational complexity Ct are set, based on an overall encoder computational complexity.

Next, at operation 405, when the video data is input, the motion of the moving image is estimated by updating the threshold value according to the number of search points per macro block of each frame, comparing the threshold value with the SAD, and controlling the searching of the macro block according to the compared result, as explained in the flowchart of FIG. 3.

After operation 405, at operation 410, search point numbers per macro block of an nth frame of which motion is estimated are averaged to calculate the ME computational complexity S(n). In this case, general high-speed motion estimation methods are disadvantageous in that searching computational complexity per macro block is not constant. The general high-speed motion estimation methods are classified into methods, wherein the number of search points in search regions are not the same, e.g., the block-based gradient descent searching (BBGDS) method, and methods wherein a calculation required per block matching is effectively reduced, e.g., a fast-full searching method. The ME computational complexity per frame can be calculated by one of the above methods.

After operation 410, at operation 420, the ME computational complexity S(n) of the previous frame is subtracted from the target ME computational complexity St to obtain a difference, i.e., St−S(n), in the ME computational complexity. In other words, the method checks whether the ME computational complexity S(n) of the previous frame is larger or smaller than the target ME computational complexity St, which is based on the fact that the ME computational complexity of continuous frames, e.g., the previous frame and the current frame, are similar.

At operation 430, the difference St−S(n) is added to the original target DCT computational complexity Ct to obtain an updated target DCT computational complexity C′$_t$. Here, the target ME computational complexity St and the ME computational complexity S(n) of the previous frame denote the average number of search points per macro block, and the target DCT computational complexity Ct denotes the total number of DCT performing blocks per macro block. Thereafter, the difference St−S(n) is just added to the original target DCT computational complexity Ct on an assumption that computational complexity spent processing one search point is the same as the 8'8 DCT computational complexity. If the computational complexity spent processing one search point is different from that of the 8'8 DCT computational complexity, the difference St−S(n) is multiplied by a proper weight w and added to the original target DCT computational complexity Ct, thereby obtaining w (St−S(n) )+C$_t$.

At operation 440, the threshold value T$_{on+1}$ of the current frame, which is used to determine whether DCT is performed on the current frame, is set based on the updated target DCT computational complexity C′$_t$.

The threshold value T$_{on+1}$ of the current frame is obtained as follows.

A DCT complexity refers to a probability that the DCT unit performs the DCT on the video data, and it is determined with the number of DCT performing blocks. Because the threshold value T$_{on+1}$ is inversely proportional to a threshold value and quantization coefficient (T$_0$Q), the DCT complexity is expressed by the following equation:

$$C \approx \frac{v}{T_0 Q} \quad (6)$$

wherein To denotes a threshold value, and Q denotes a quantization coefficient. In case of an nth frame, a formula of n=C$_n$Q$_n$T$_{on}$ is obtained from equation 6.

Also, a threshold value of an n+1st frame may be obtained from equation 6 as follows:

$$T_{on+1} = \frac{v}{C_t Q_{n+1}} \quad (7)$$

wherein C$_t$ denotes the target DCT complexity.

Equation 7 may be also written as follows:

$$T_{on+1} = T_{on} \frac{Q_n C_n}{C_t Q_{n+1}} \quad (8)$$

Equation 8 may be also written as follows:

$$T_{on+1} = T_{on} \frac{Q_n}{Q_{n+1}} \left(1 + \frac{C_n - C_t}{C_t}\right) \quad (9)$$

Equation 9 may be written as follow:

$$T_{on+1} = T_{on} \frac{Q_n}{Q_{n+1}} \left(1 + \frac{C_n - C_t}{kC_t}\right) \quad (10)$$

wherein a convergence speed of the threshold value T$_{on+1}$ depends on a constant k. Referring to equation 10, it is noted that the threshold value T$_{on+1}$ of the current frame is calculated with the threshold value Ton of the previous frame, quantization coefficients Q$_n$ and Q$_{n+1}$, and the DCT complexity C$_n$ of the previous frame.

Lastly, if the target DCT complexity Ct presented in equation 10 is updated to a target DCT computational complexity C$_t$′, i.e., C$_t$′=C$_t$+S$_t$−S$_n$, the threshold value T$_{on+1}$ of the current frame, which is applied to the present invention, is calculated as follows:

$$T_{on+1} = T_{on} \frac{Q_n}{Q_{n+1}} \left(1 + \frac{C_n - C'_t}{kC'_t}\right) \quad (11)$$

wherein T$_{on}$ denotes the threshold value of the previous frame, Q$_n$ denotes the quantization coefficient of the previous frame, Q$_{n+1}$ denotes the quantization coefficient of the previous frame, C$_n$ denotes the DCT computational complexity of the previous frame, k denotes a constant, and C′$_t$ denotes the updated target DCT computational complexity.

After operation 440, at operation 450, the SAD and quantization parameter Q$_{n+1}$ per block, which are respectively produced during ME and quantization, are compared with the threshold value T$_{on+1}$ of the current frame.

If the SAD/quantization parameter Q$_{n+1}$ is smaller than the threshold value T$_{on+1}$, at operation 460, the DCT is not performed on a related block and the block is restricted to not to be coded. At operation 470, if the SAD/quantization parameter Q$_{n+1}$ is larger than the threshold value T$_{on+1}$, a DCT is performed on the block.

After operation 470, at operation 480, the method checks whether encoding input moving images ended, and if not, the above operations are repeated until the encoding ends.

As described above, according to an aspect of the present invention, using a certain high-speed motion estimation method, the ME unit 280 regularly maintains the ME computational complexity fixed by adjusting the threshold value TH of each frame while applying the difference in the computational complexity of the ME unit 280 to the DCT skipping module. As a result, it is possible to maintain the amount of overall computation of an encoder closely to a target computational complexity, i.e., $C_t+S_t$.

Figure 5:
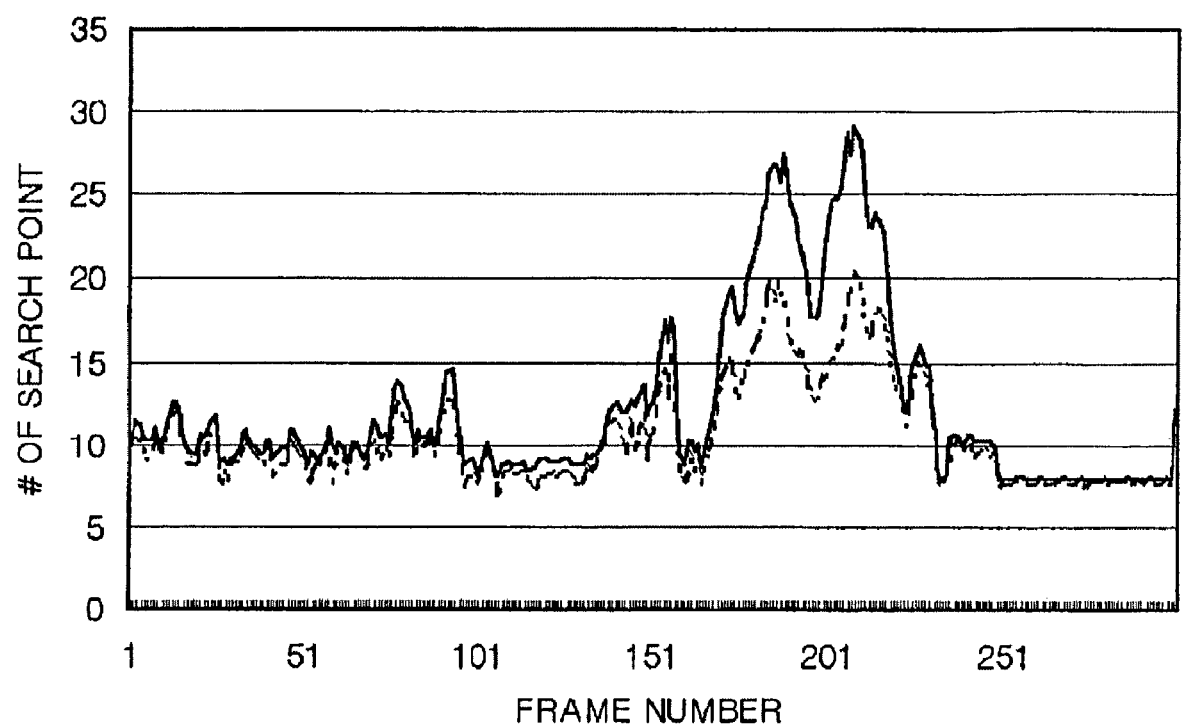
FIG. 5 is a graph illustrating a number of searching points per frame when a threshold value is adjusted when carrying out the method illustrated in FIG. 3.

FIG. 5 is a graph illustrating the number of search points per frame when the threshold value TH is adjusted using equation 5, during the motion estimation method of FIG. 3. In the graph of FIG. 5, a dotted line illustrates a distribution of the search point numbers obtained when carrying out the motion estimation method, according to an aspect of the present invention, and a solid line illustrates a distribution of the search point numbers when not carrying out the motion estimation method, according to an aspect of the present invention. The graph of FIG. 5 reveals that it is possible to effectively reduce a rapid increase in the number of search points due to a sudden increase in motion of the image without degradation of the performance of the encoder.

The present invention can be embodied as a computer readable code that can be executed by a computer readable medium. Here, the computer readable medium may be any recording apparatus capable of storing data that can be read by a computer system, e.g., a read-only memory (ROM), a random access memory (RAM), a compact disc (CD)-ROM, a magnetic tape, a floppy disk, flash memory, an optical data storage device, and so on. Also, the computer readable medium may be a carrier wave that transmits data via the Internet, for example. The computer readable recording medium can be remotely installed in a computer system connected to a network, and may store and execute a computer readable code by a distributed computing environment.

As described above, in a motion estimation method, according to an aspect of the present invention, a number of search points per frame is adjusted by adaptively updating a threshold value per frame, thereby regularly maintaining fixed a computational complexity of a video encoder irrespective of characteristics of an image. Also, a use of a DCT skipping method, which is designed in consideration of a motion estimation (ME) computational complexity, together with the motion estimation method makes it possible to regularly maintain an overall encoding computational complexity, even if a high-speed motion estimation method is used. That is, as shown in FIG. 2, a video encoder, according to an aspect of the present invention, first reduces a difference in the ME computational complexity of a frame, and updates a target DCT computational complexity based on the reduced difference. Therefore, it is possible to maintain the computational complexity of the video encoder effectively and regularly than when updating the target DCT computational complexity without adjusting the computational complexity of a motion estimation unit.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method to encode a moving image to estimate motion vectors of the moving image, the method comprising:
comparing a sum of absolute difference (SAD) of candidate motion vectors with a threshold value that is set based on an average number of search points per macro block of a previous frame;
ending searching of the motion vectors of macro blocks when the SAD of each candidate motion vector is smaller than the threshold value;
determining one of the candidate motion vectors having a minimum SAD to be a motion vector; and
updating the threshold value with respect to a next frame according to the average number of search points per macro block of a current frame when searching for the motion vector ends.

2. A method to encode a moving image to estimate motion vectors of the moving image, the method comprising:
comparing a sum of absolute difference (SAD) of candidate motion vectors with a threshold value that is set based on a number of search points per macro block of a previous frame;
ending searching of the motion vectors of macro blocks when the SAD of each candidate motion vector is smaller than the threshold value;
determining one of the candidate motion vectors having a minimum SAD to be a motion vector; and
updating the threshold value with respect to a next frame according to the number of search points per macro block of a current frame when searching for the motion vector ends;
wherein the comparing of the SAD further comprises:
comparing the SAD with a minimum SAD when the SAD of each candidate motion vector is larger than the threshold value;
determining the SAD to be the minimum SAD when the SAD is smaller than the minimum SAD;
calculating the SAD of a next candidate motion vector when the SAD is larger than the minimum SAD;
ending searching of the motion vector of a current macro block when the next candidate motion vector is not present;
determining the candidate motion vector having the minimum SAD to be the motion vector; and
updating the threshold value to be applied to the next frame according to the number of search points per macro block of the current frame when searching for the candidate motion vector ends.

3. The method of claim 1, wherein the updating of the threshold value is determined according to the number of search points per macro block of the current frame when the next macro block is not present.

4. A method to encode a moving image to estimate motion vectors of the moving image, the method comprising:
comparing a sum of absolute difference (SAD) of candidate motion vectors with a threshold value that is set based on a number of search points per macro block of a previous frame;
ending searching of the motion vectors of macro blocks when the SAD of each candidate motion vector is smaller than the threshold value;
determining one of the candidate motion vectors having a minimum SAD to be a motion vector; and
updating the threshold value with respect to a next frame according to the number of search points per macro block of a current frame when searching for the motion vector ends;
wherein the threshold value is updated by THn=Sn/St,
where THn denotes a previous threshold value, Sn denotes an average number of search points per macro block of the previous frame, and St denotes a target number of search points per macro block.

5. A method to encode a moving image, comprising:
comparing a threshold value, which is set according to a number of search points per macro block of a previous frame, with a sum of absolute difference (SAD) of a motion vector of the previous frame and outputting a compared result;
determining whether searching of a macro block ends according to the compared result and outputting a determination result;
estimating a motion estimation (ME) of the moving image based on the determination result;
calculating a computational complexity of the motion estimation (ME) to obtain a difference between the ME computational complexity and a target;
updating a target discrete cosine transform (DOT) complexity based on a difference between the ME computational complexity and the target;
setting the threshold value based on the updated target DCT complexity, in order to determine whether to skip performing the DCT on video data; and
determining whether to perform a DCT process on the video data of a current frame according to the set threshold value.

6. The method of claim 5, wherein the ME computational complexity is obtained by calculating a number of search points per macro block.

7. The method of claim 5, where the target DCT computational complexity is updated by adding the difference in the ME computational complexity to the target DCT computational complexity.

8. The method of claim 5, wherein in the skipped performing of the DCT process, the threshold value of the current frame is calculated by the following equation:

$$T_{on+1} = T_{on}\frac{Q_n}{Q_{n+1}}\left(1 + \frac{C_n - C'_t}{kC'_t}\right),$$

wherein $T_{on+1}$ denotes a threshold value of the current frame, Ton denotes a threshold value of the previous frame, $Q_n$ and $Q_{n+1}$ denote quantization coefficients of the previous frame, $Q_{n+1}$ denotes a quantization coefficient of the current frame, $C_n$ denotes DCT computational complexity of the previous frame, k denotes a constant, and $C'_t$ denotes the updated target DCT computational complexity.

9. An apparatus to encode a moving image, comprising:
a discrete cosine transform (DCT) unit performing DCT on input video data on a block-by-block basis;
a quantizer quantizing the video data on which the DCT is performed and generating a quantization parameter;
a motion estimation (ME) unit updating a threshold value TH according to an average number of search points per macro block of a previous frame, comparing the threshold value TH with a sum of absolute difference (SAD) per macro block, and estimating a motion vector of a current frame;
a DCT computational complexity calculator calculating computational complexity according to the average number of search points per macro block according to the threshold value TH per frame updated, estimating a difference between the calculated computational complexity and a target ME computational complexity, and updating a target DCT computational complexity based on the estimated ME computational complexity; and
a DCT skipping unit setting a threshold value to determine whether to skip performing DCT on the video data based on the updated target DCT computational complexity, comparing the SAD per macro block generated by the ME unit and the quantization parameter with the threshold value, and determining whether to allow the DCT unit to perform the DCT on the video data.

10. An apparatus to encode video data, comprising:
a discrete cosine transform (DCT) skipping unit generating a DCT skipping control signal;
a DCT unit performing a DCT process on the video data in an 8×8 block-by-block unit or processing the video data not to be coded in response to the DCT skipping control signal;
a quantizer quantizing the video data on which the DCT process is performed;
a variable length coding (VLC) unit removing statistical redundancy from the quantized video data;
an inverse quantizer (IQ) inversely quantizing the quantized video data;
an inverse DCT (IDCT) unit performing an IDCT on the inversely quantized video data;
a motion estimation (ME) unit estimating a motion vector (MV) and a sum of absolute difference (SAD) per macro block using the video data of a current frame and the video data of a previous frame, wherein during the estimation of the MV and the SAD, the ME unit updates a threshold value TH according to an average number of search points of the previous frame per macro block, compares the updated threshold value TH and the SAD with respect to the current frame, and determines whether searching for the motion vector is terminated.

11. An apparatus to encode video data, comprising:
a discrete cosine transform (DCT) skipping unit generating a DCT skipping control signal;
a DCT unit performing a DCT process on the video data in an 8×8 block-by-block unit or processing the video data not to be coded in response to the DCT skipping control signal;
a quantizer quantizing the video data on which the DCT process is performed;
a variable length coding (VLC) unit removing statistical redundancy from the quantized video data;
an inverse quantizer (IQ) inversely quantizing the quantized video data;
an inverse DCT (IDCT) unit performing an IDCT on the inversely quantized video data;
a motion estimation (ME) unit estimating a motion vector (MV) and a sum of absolute difference (SAD) per macro block using the video data of a current frame and the video data of a previous frame; and
a DCT computational complexity calculator calculating an overall ME computational complexity of the previous frame to estimate a difference between the overall ME computational complexity and a target ME, and updating a target DCT computational complexity based on the difference;
wherein during the estimation of the MV and the SAD, the ME unit updates a threshold value TH according to an average number of search points of the previous frame per macro block, compares the updated threshold value TH and the SAD with respect to the current frame, and determines whether searching for the motion vector is terminated.

12. The apparatus of claim 10, further comprising:
a frame memory (FM) unit storing the video data, on which the IDCT unit, in frame units, performs the IDCT.

13. The apparatus of claim 10, wherein the DCT skipping unit sets a threshold value $T_{on+1}$ according to the updated target DCT computational complexity to skip performing the DCT process on the current frame.

14. The apparatus of claim 13, wherein the DCT skipping unit compares the SAD per block estimated by the ME unit and a quantization parameter (QP) estimated by the quantizer with the set threshold value $T_{on+1}$, and sends the DCT unit a compared result as the DCT skipping information.

15. A computer readable storage storing a computer program executed by a computer to estimate a motion of a moving image according to a process comprising:
comparing a sum of absolute difference (SAD) of candidate motion vectors with a threshold value that is set based on an average number of search points per macro block of a previous frame;
ending searching of the motion vectors of macro blocks when the SAD of each candidate motion vector is smaller than the threshold value;
determining one of the candidate motion vectors having a minimum SAD to be a motion vector; and
updating the threshold value with respect to a next frame according to the average number of search points per macro block of a current frame when searching for the motion vector ends.

16. A computer readable storage storing a computer program executed by a computer to estimate a motion of a moving image according to a process comprising:
adjusting a number of search points per frame by adaptively updating a threshold value TH per frame to regularly maintain fixed a computational complexity of a video encoder irrespective of characteristics of the moving image;
wherein the threshold value to be applied to the next frame is updated according to the average number of search points per macro block of the current frame when searching for the candidate motion vector ends.

17. The computer readable storage of claim 16, wherein the comparing of the SAD further comprises:
comparing the SAD with a minimum SAD when the SAD of each candidate motion vector is larger than the threshold value;
determining the SAD to be the minimum SAD when the SAD is smaller than the minimum SAD;
calculating the SAD of a next candidate motion vector when the SAD is larger than the minimum SAD;
ending searching of the motion vector of a current macro block when the next candidate motion vector is not present;
determining the candidate motion vector having the minimum SAD to be the motion vector; and
updating the threshold value to be applied to the next frame according to the number of search points per macro block of the current frame when searching for the candidate motion vector ends.

18. The computer readable storage of claim 16, further comprising:
estimating a motion of a next frame based on the threshold value TH.

19. The computer readable storage of claim 16, wherein the threshold value TH of an n+1st frame is calculated as follows:

$$TH_{n+1} = \omega \cdot \frac{1}{M} \sum_{i=0}^{M} SAD_{n\min}[i]$$

where M denotes a number of macro blocks per frame, $SAD_{n\min}$ denotes a minimum SAD of an ith macro block for an nth frame, and w denotes a constant.

20. The computer readable storage of claim 16, wherein the threshold value TH is inversely proportional to an average number of search points as follows:

$$TH_n \propto \frac{1}{S_n}$$

where Sn denotes a motion estimation computation complexity in an nth frame.

21. A computer readable storage storing a computer program executed by a computer to estimate a motion of a moving image according to a process comprising:
comparing a threshold value, which is set according to a number of search points per macro block of a previous frame, with a sum of absolute difference (SAD) of a motion vector of the previous frame and outputting a compared result;
determining whether searching of a macro block ends according to the compared result and outputting a determination result;
estimating a motion estimation (ME) of the moving image based on the determination result;
calculating a computational complexity of the motion estimation (ME) to obtain a difference between the ME computational complexity and a target;
updating a target discrete cosine transform (DCT) complexity based on a difference between the ME computational complexity and the target; setting the threshold value based on the updated target DCT complexity, in order to determine whether to skip performing the DCT on video data; and
determining whether to perform a DCT process on the video data of a current frame according to the set threshold value.

* * * * *

UNITED STATES PATENT AND TRADEMARK OFFICE
CERTIFICATE OF CORRECTION

PATENT NO. : 7,177,359 B2
APPLICATION NO. : 10/323745
DATED : February 13, 2007
INVENTOR(S) : Byung-cheol Song et al.

It is certified that error appears in the above-identified patent and that said Letters Patent is hereby corrected as shown below:

Column 10, Line 65, change the "THn=Sn/St," to --THn*Sn/St,--.

Column 11, Line 17, change "(DOT)" to --(DCT)--.

Column 11, Line 44, change "Ton" to --$T_{on}$--.

Column 14, Line 19, change "w" to --$\omega$--.

Column 14, Line 28, change "Sn" to --$S_n$--.

Signed and Sealed this

Twenty-second Day of May, 2007

JON W. DUDAS
*Director of the United States Patent and Trademark Office*